United States Patent
Bazemore et al.

Patent Number: 5,377,263
Date of Patent: Dec. 27, 1994

[54] TELEPHONE DIALER CARD

[75] Inventors: James Bazemore; Jeanine J. Bazemore, both of Omaha, Nebr.

[73] Assignee: Dial One Fastcard, Omaha, Nebr.

[21] Appl. No.: 104,263

[22] Filed: Dec. 29, 1992

Related U.S. Application Data

[63] Continuation of Ser. No. 694,242, May 1, 1991, abandoned.

[51] Int. Cl.⁵ .................................... H04M 1/00
[52] U.S. Cl. ........................... 379/355; 379/356; 379/357
[58] Field of Search ............ 379/216, 355, 356, 357, 379/352, 353, 354

[56] References Cited

U.S. PATENT DOCUMENTS

| | | | |
|---|---|---|---|
| 4,126,768 | 11/1978 | Grenzow | 379/357 |
| 4,130,738 | 12/1978 | Sandstedt | 379/387 |
| 4,178,487 | 12/1979 | Lake et al. | 379/357 |
| 4,442,318 | 4/1984 | Desrochers. | |
| 4,677,657 | 6/1987 | Nagata et al. | |
| 4,803,724 | 2/1989 | Utoh et al. | 379/433 |
| 4,817,135 | 3/1989 | Winebaum | 379/355 |
| 4,941,172 | 7/1990 | Winebaum et al. | 379/352 |
| 4,947,424 | 8/1990 | Shaanan et al. | 379/355 |
| 4,984,268 | 1/1991 | Brown et al. | 379/433 |
| 4,995,077 | 2/1991 | Malinowski | 379/355 |
| 5,081,674 | 1/1992 | Wijas et al. | 379/433 |

FOREIGN PATENT DOCUMENTS

| | | | |
|---|---|---|---|
| 0071359 | 4/1987 | Japan | 379/357 |
| 0283260 | 11/1988 | Japan. | |
| 0036129 | 2/1989 | Japan. | |
| 0073847 | 3/1989 | Japan | 379/357 |
| 0374723 | 3/1964 | Switzerland | 379/433 |

*Primary Examiner*—Curtis Kuntz
*Assistant Examiner*—Jason Chan
*Attorney, Agent, or Firm*—James Creighton Wray

[57] ABSTRACT

A credit card thin speed dialing apparatus has a battery, a tone generator with memory, and a crystal and a round transducer sandwiched by "O" rings. The outer surfaces of the apparatus have a selector slide and a push button on the top and an opening on the bottom below the transducer. The slide selects one number sequence. The apparatus is activated when the button is pushed, sending energy from the battery to the tone generator. The tone generator then sends the complete stored electrical signal to the transducer, vibrating the transducer for emitting dial tone frequencies from the vibrations of the transducer through the opening in the bottom of the frame of the apparatus. The card has a complex number memory storage capacity, which includes nine digits, two pauses and a PIN code which may be fourteen digits or more, with 35 elements or more in sequence. The start button and the transducer opening are on opposite sides, near the same end.

10 Claims, 2 Drawing Sheets

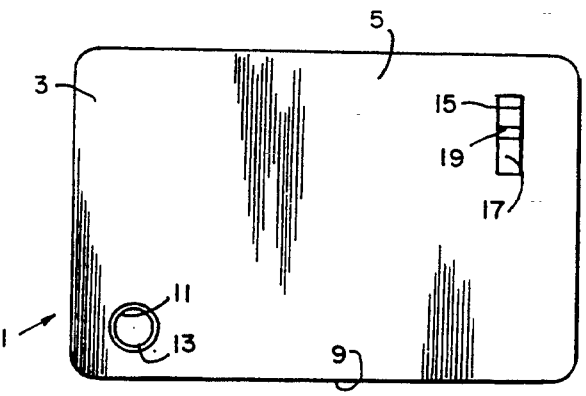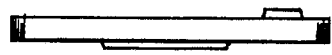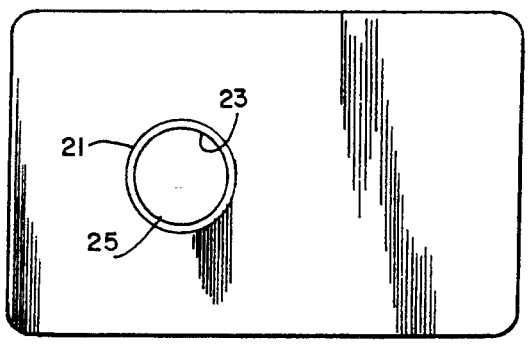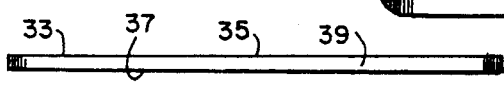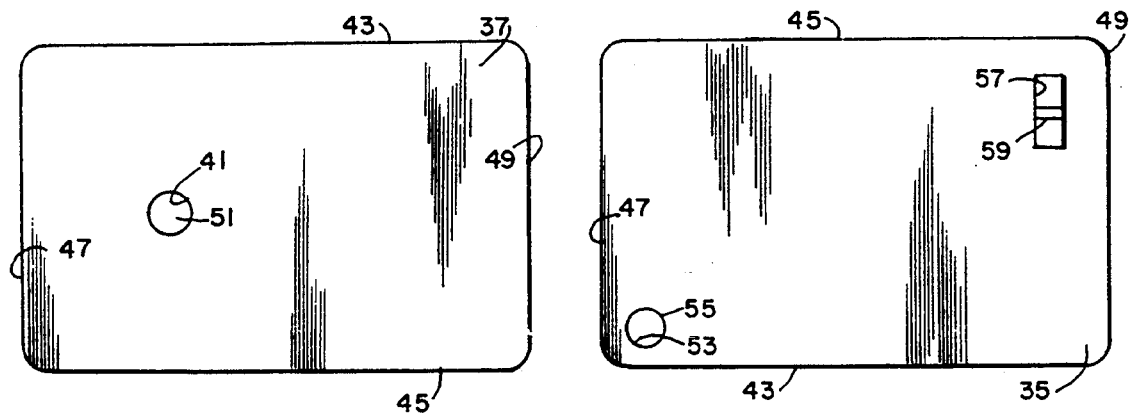

TELEPHONE DIALER CARD

This is a continuation application of Ser. No. 07/694,242, filed May, 1991, now abandoned.

BACKGROUND OF THE INVENTION

The telephone is the widest used of all communication devices.

Telephone dialers are popular devices which automatically dial preprogrammed numbers. Such dialers are used on telephones, usually as an extra set of push buttons or as a prearranged code using the ordinary key pad. Telephone companies store frequently dialled numbers for speed dialing subscribers.

With increased use of the telephone and increased telephone stations, numbers become more complex. In the United States at the time of this invention, a standard number has seven digits, a cross-town number may have ten digits, and a long-distance number has eleven digits. International dialing may require fourteen digits or more. A credit card may have fourteen or sixteen digits or more which may need to be transmitted into a standard telephone mouthpiece. A telephone credit card at this time typically has fourteen digits.

A need for speed dialers of all types continues to exist. The field of speed dialers is crowded, and even small advances make major contributions to the field of speed dialing.

The term "dialer" may be a misnomer and is used universally and herein to include the input into a telephone line of standard DTMF tones as well as interrupt sequences.

The present invention is directed to providing a speed dialer using unique construction and technology, making the dialer commonly available and commonly portable.

SUMMARY OF THE INVENTION

The present invention uniquely provides a standard credit card size telephone dialer tone sequence generator, which may be carried in a person's wallet with other credit cards. When it is necessary to make a telephone call, a person simply removes the credit card dialer from his wallet, slides the selector to the desired location, holds the transducer opening against the mouthpiece, and pushes a start button.

A preferred credit card thin speed dialing apparatus has a battery, a tone generator with memory, and a crystal and a round transducer sandwiched by "O" rings. The outer surfaces of the apparatus have a selector slide and a push button on the top and an opening on the bottom below the transducer. The slide selects one number sequence. The apparatus is activated when the button is pushed, sending energy from the battery to the tone generator. The tone generator then sends the complete stored electrical signal to the transducer, vibrating the transducer for emitting dial tone frequencies from the vibrations of the transducer through the opening in the bottom of the frame of the apparatus. The card has a complex number memory storage capacity, which includes nine digits, two pauses and a personal identifier number (PIN) code or a credit card number, which may be fourteen digits or more, with 35 elements or more in sequence. The start button and the transducer opening are on opposite sides, near the same end.

A preferred telephone dialer card is formed of two credit card blanks sealed around edges thereof and has first and second outer faces. The first and second outer faces have a first opening for a push button switch, a second opening for a slide switch, and a third opening for directing audible tones from within the card into a telephone mouthpiece.

A power source is positioned between the credit card blanks and a tone generator is connected to the power source. A selector is connected to the tone generator for selecting one of two or more tone sequences, and a speaker is connected to the tone generator for supplying audible signals through the third opening.

The preferred power source is a battery, and the tone generator comprises a microprocessor memory chip and a crystal.

The preferred microprocessor chip comprises a twenty terminal chip and the battery is connected between adjacent terminals. The crystal is connected between other adjacent terminals, and the transducer is connected between further adjacent terminals.

A preferred telephone dialer card apparatus has first and second credit card-size plastic sheets. A tone generator memory chip is positioned on an upper surface of the first sheet, and a crystal is connected to the memory chip and is positioned on an upper surface of the first sheet. A start switch is connected to the memory chip and is positioned on an upper surface of the first sheet. A selector switch is connected to the memory chip and is positioned on an upper surface of the first sheet. A power source is connected to the memory chip and is positioned on an upper surface of the first sheet. A transducer is connected to the memory chip and to the power source and is positioned on an O-ring on an upper surface of the first sheet. The second sheet is positioned over the transducer, the memory chip, the crystal, the start switch, the selector switch and the battery. The edges of the first and second sheets are aligned and sealed.

First and second O-rings are positioned between the transducer and the first and second sheets respectively for permitting vibration of the transducer.

The first and second O-rings are positioned along null lines on opposite surfaces of the transducer. An opening in the first sheet is aligned with the transducer.

The sheets have a rectangular form with first and second parallel long edges and first and second parallel short edges. The first transducer access opening in the first sheet is formed midway between the first and second long edges and nearer the first short edge than the second short edge.

A second opening is formed in the second sheet, and the start switch is positioned between the sheets adjacent the second opening. Preferably, the second opening is positioned in a corner of the second sheet near an intersection of the first long edge and the first short edge.

The preferred start switch is a push button switch with a button which projects into the second opening or which is accessed through the second opening. There is a third opening in the second sheet, and the selector switch is positioned between the sheets near the third opening. The preferred switch is a two-position slide switch, and the third opening is elongated for permitting a slide on the slide switch to be moved between first and second positions.

Preferably a slide operator projects into the third opening. The preferred power source is a lithium battery, and the memory chip is a twenty terminal UM9120DM chip.

These and further and other objects and features of the invention are apparent in the disclosure, which includes the above and ongoing written specification, with the claims and the drawings.

BRIEF DESCRIPTION OF THE DRAWINGS

FIG. 1 is a top view of a telephone dialer card of the present invention.

FIG. 2 is an edge elevation of the telephone dialer card.

FIG. 3 is one end elevation of the telephone dialer card.

FIG. 4 is a bottom view of the telephone dialer card shown in FIGS. 1-3.

FIG. 5 is an edge elevation of a second preferred embodiment of the telephone dialer card.

FIG. 6 is a top elevation of the telephone dialer card shown in FIG. 5.

FIG. 7 is a bottom elevation of the telephone dialer card shown in FIGS. 6 and 7.

DETAILED DESCRIPTION OF THE DRAWINGS

Figure 8:
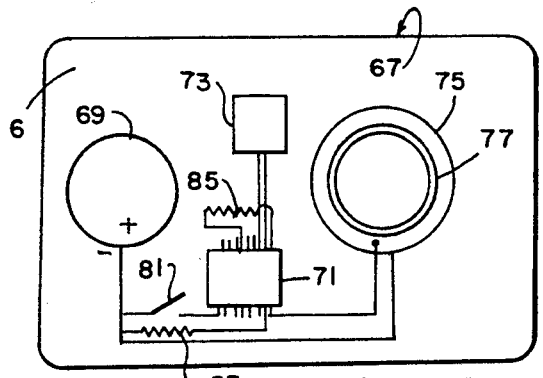
FIG. 8 is a schematic drawing showing elements arranged on a base card.

Referring to FIGS. 1-4, one embodiment of a credit card dialer is generally indicated by the numeral 1. The dialer has a credit card shape 3 with upper and lower faces 5 and 7 bordered by an edge 9. In one corner of the upper face 5 is a raised guard 11, which surrounds a push button 13. An opening 15 reveals a slide 17 of a slide switch which is moved by button 19 between two or more positions to select a predetermined number sequence. The bottom face 7 has a raised area 21 which surrounds an opening 23, exposing a transducer 25 within the card body. Raised circular areas may be omitted or may be formed by flowing the surrounding card material for example with heated dies when forming the card openings.

A preferred form of the invention is shown in FIGS. 5-7. A thin credit card dialer 31 has a flat credit card size body 33, with flat upper and lower faces 35 and 37 and a surrounding edge 39. An opening 41 in the bottom face is aligned centrally between side edges 43 and 45 and nearer one end edge 47 than the other end edge 49. The opening 41 exposes a central portion of a transducer 51.

As shown in FIG. 1, the top of the card 35 has an opening 53 in a corner near a long edge 43 and a first short edge 47, which exposes a start push button 55. An opening 57 near the opposite corner exposes a slide 59 for a selector switch.

As shown in FIG. 8, the inside 61 of the base card 67 mounts a battery 69 as a power source. A preprogrammed chip 71 is connected to the battery, to a crystal 73 and a transducer 75, which has O-ring mounts 77 on opposite sides of the transducer at null positions along null lines of the vibrating transducer. The mountings ensure full volume and true tones from the transducer because of the non-constricting, non-attenuating mounting. The inter-card cavity also provides resonance and strength to the transducer output with attendant savings in power. The O-ring 79 may lie inside of the top surface 61 of the base card 67. Alternatively, an O-ring having a C-shaped cross-section may be received in the opening and may lie partially inside and partially outside the base card 67.

The push button switch 81 is schematically shown, and resistors 83 and 85 complete the assembly. A dual number dialer has a slide switch connected to distinct pins on chip 71.

Figure 9:
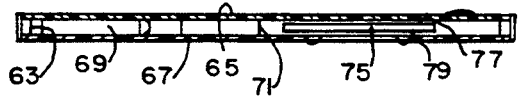
FIG. 9 is a cross-sectional elevation showing elements between two credit card layers.

FIG. 9 shows the upper card 65 and the edge spacer 63, which may be a thin strip with adhesive on both sides which adheres to inert surfaces of the card 67 and 65. Alternatively, the spacer 63 may be a T-shaped extruded strip with caps which surround ends of the cards. The block and cap may be secured to the card with an adhesive, or may be fused or welded to the cards.

Figure 10:
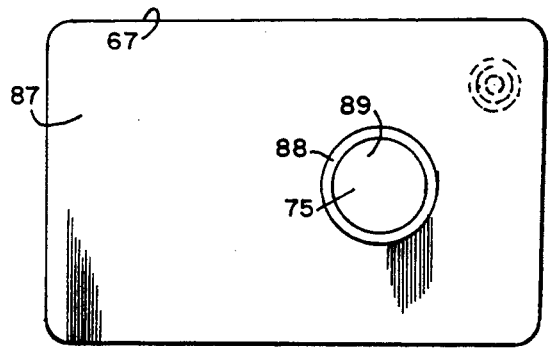
FIG. 10 is a bottom view, showing the transducer opening in relation to the push button.

FIG. 10 shows the outer surface 87 of card 67 with an O-ring having a grooved periphery 88 surrounding opening 89 through which the transducer 75 is exposed.

Figure 11:
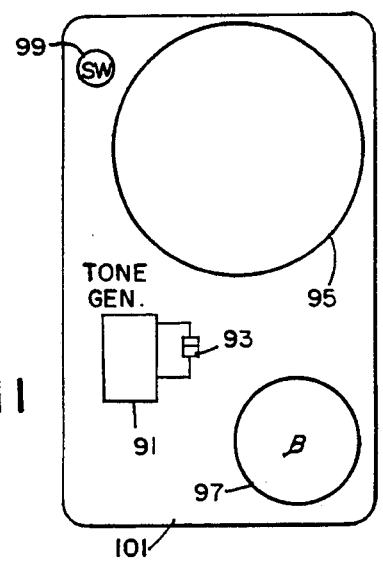
FIG. 11 is a schematic drawing showing arrangement of parts.

The schematic shown in FIG. 11 shows a tone generator chip 91 and a frequency crystal 93, a transducer 95 and battery 97, and a switch 99 mounted on a base card 101.

Figure 12:
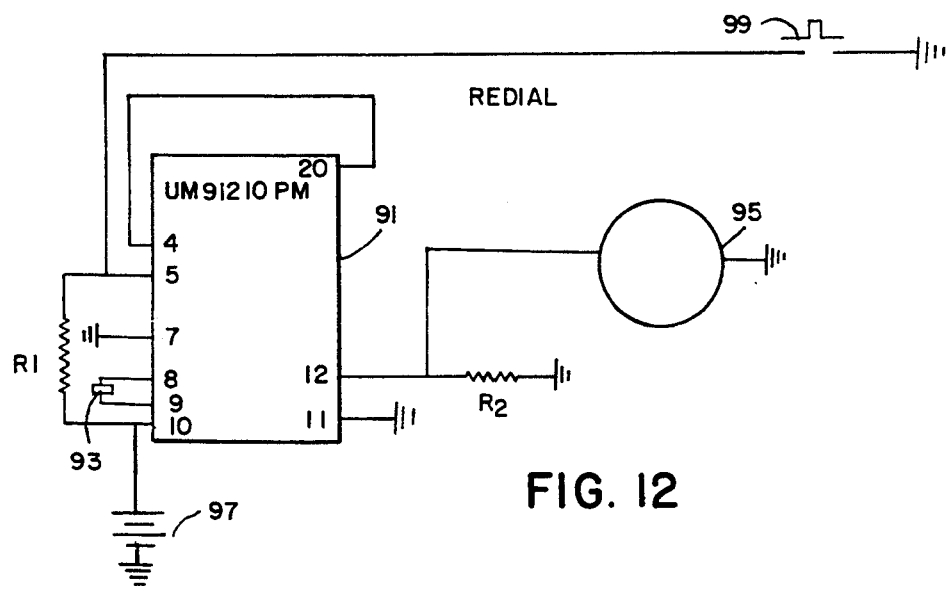
FIG. 12 is a schematic drawing showing the operational arrangement of parts.

As shown in FIG. 12, the tone generator is a twenty terminal UM9120DM chip 91, and the crystal 93 is connected between terminals 8 and 9. A resistor R1 is connected between terminal 5 and 10. The battery 97 is connected to terminal 10. Terminals 7 and 11 are grounded and terminal 12 supplies the output to the transducer 75, which is connected in parallel with a resistor R2. Push button 99 grounds terminal 5, starting the preprogrammed tone generation sequence.

The slide switch 19 shown in FIG. 1 is connected to a separate tone generator similar to 91, which is in turn connected to the transducer 95.

In one embodiment, the tone generator apparatus includes an additional tone generator chip with identical resistors and connections to the battery, and the crystal and the transducer are provided to increase the capacity of the card. The selector switch may be connected between the push button and the similar chips to select one of the generators for operation.

Battery 97 is preferably a Cr2016 lithium battery. Crystal 93 has a 3.58 MHz frequency. Transducer 95 is a Panasonic EFB-VM 35B171 or equivalent. Terminals 4 and 20 are connected by a redialing strap. Preferred dimensions of the dialing card are 5.5"×8.6"×0.3". The transducer opening is about 0.8".

While the invention has been described with reference to specific embodiments, modifications and variations of the invention may be constructed without departing from the scope of the invention, which is defined in the following claims.

We claim:

1. A telephone dialer card apparatus comprising two credit card-like sheets sealed around edges thereof and having first and second outer faces enclosing a cavity, the first outer face having a push button switch in a first opening for activating a tone generator placed between the two sheets, and a slide switch in a second opening for selecting one of plural tone sequences generated by the activated tone generator, and the second outer face having a transducer in a third opening for receiving the selected tone sequence, emitting a dial tone frequency and supplying said frequency as an audible signal to a receiver, said apparatus further comprising first and second O-rings positioned between the transducer and the first outer face and the transducer and the second outer face respectively for permitting vibration of the transducer, wherein the first and second O-rings are positioned along null lines on opposite surfaces of the transducer, wherein the sheets have first and second long edges and first and second short edges, and wherein the first opening for the push button switch is generally formed in a corner of the outer face proximal an intersection of the first long edge and the first short edge and wherein the third opening is generally formed midway between the first and second longer edges and nearer the first short edge than the second short edge.

2. The apparatus of claim 1, further comprising positioned between the credit card-like sheets a power source, the tone generator being connected to the power source, the slide switch connected to the tone generator for selecting one of plural tone sequences, and wherein the transducer is connected to the tone generator for supplying audible signals through the third opening.

3. The apparatus of claim 2, wherein the power source is a battery and wherein the tone generator comprises a microprocessor memory chip and a crystal.

4. The apparatus of claim 3, wherein the microprocessor chip comprises a twenty terminal chip and wherein the battery is connected between adjacent terminals, wherein the crystal is connected between other adjacent terminals and wherein the transducer is connected between further adjacent terminals.

5. A telephone dialer card apparatus, comprising first and second credit card-size plastic sheets enclosing a cavity, a tone generator memory chip positioned on an upper surface of the first sheet, a crystal connected to the memory chip and positioned on the upper surface of the first sheet, a start switch connected to the memory chip and positioned on the upper surface of the first sheet, a selector switch connected to the memory chip and positioned on the upper surface of the first sheet, a power source connected to the memory chip and positioned on the upper surface of the first sheet, a transducer connected to the memory chip and to the power source and positioned on the upper surface of the first sheet, the second sheet being positioned over the transducer, the memory chip, the crystal, the start switch, the selector switch and the battery, edges of the first and second sheets being aligned and being sealed, wherein operating the start switch activates the tone generator to generate plural tone sequences, one of at least two of the tone sequences being selected by the selector switch, the selected tone sequence being sent to the transducer for vibrating the transducer and emitting a dial tone frequency and supplying said frequency as an audible signal to a receiver, said apparatus further comprising first and second O-rings positioned between the transducer and the first sheet and the transducer and the second sheet respectively for permitting vibration of the transducer, wherein the first and second O-rings are positioned along null lines on opposite surfaces of the transducer, wherein the sheets have rectangular form with first and second parallel long edges and first and second parallel short edges, and wherein a first opening in the first sheet is formed midway between the first and second long edges and nearer the first short edge than the second short edge, the first opening being aligned with the transducer, said apparatus further comprising a second opening in the second sheet and the start switch being positioned between the sheets adjacent the second opening, wherein the second opening is positioned in a corner of the second sheet near an intersection of the first long edge and the first short edge.

6. The apparatus of claim 5, wherein the start switch is a push button switch with a button which projects into the second opening.

7. The apparatus of claim 6, further comprising a third opening in the second sheet, wherein the selector switch is positioned between the sheets near the third opening.

8. The apparatus of claim 7, wherein the selector switch is a two-position slide switch and wherein the third opening is elongated for permitting a slide on the slide switch to be moved between first and second positions.

9. The apparatus of claim 8, wherein a slide operator projects into the third opening.

10. The apparatus of claim 5, wherein the power source is a battery and wherein the memory chip is a twenty terminal UM9120DM chip.

* * * * *